(12) United States Patent
Hardee et al.

(10) Patent No.: US 10,607,608 B2
(45) Date of Patent: Mar. 31, 2020

(54) ADAPTIVE DIGITAL ASSISTANT AND SPOKEN GENOME

(71) Applicant: INTERNATIONAL BUSINESS MACHINES CORPORATION, Armonk, NY (US)

(72) Inventors: Christopher J. Hardee, Raleigh, NC (US); Steve Joroff, Rivervale, NJ (US); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/134,101

(22) Filed: Sep. 18, 2018

(65) Prior Publication Data
US 2019/0019499 A1 Jan. 17, 2019

Related U.S. Application Data

(62) Division of application No. 15/497,536, filed on Apr. 26, 2017.

(51) Int. Cl.
| | |
|---|---|
| *G10L 15/22* | (2006.01) |
| *G10L 13/033* | (2013.01) |
| *G10L 25/63* | (2013.01) |
| *G06F 16/41* | (2019.01) |
| *G06F 16/432* | (2019.01) |

(Continued)

(52) U.S. Cl.
CPC .............. *G10L 15/22* (2013.01); *G06F 16/41* (2019.01); *G06F 16/433* (2019.01); *G06F 16/435* (2019.01); *G10L 13/027* (2013.01); *G10L 13/0335* (2013.01); *G10L 13/047* (2013.01); *G10L 13/08* (2013.01); *G10L 25/63* (2013.01); *G10L 2015/223* (2013.01)

(58) Field of Classification Search
CPC ...................................................... G10L 15/22
See application file for complete search history.

(56) References Cited

U.S. PATENT DOCUMENTS

| | | | | |
|---|---|---|---|---|
| 5,903,892 A | * | 5/1999 | Hoffert | ................. G10H 1/0058 |
| 7,003,515 B1 | * | 2/2006 | Glaser | ................... G06F 16/683 |
| | | | | 707/723 |

(Continued)

OTHER PUBLICATIONS

Christopher J. Hardee et al., "Adaptive Digital Assistant and Spoken Genome", U.S. Appl. No. 16/134,083, filed Sep. 18, 2017.

(Continued)

*Primary Examiner* — Douglas Godbold
(74) *Attorney, Agent, or Firm* — Cantor Colburn LLP; Samuel Waldbaum

(57) ABSTRACT

Embodiments of the invention include a context sensitive adaptive digital assistant for personalized interaction. Embodiments of the invention also include a spoken genome for characterization and analysis of human voice. Aspects of the invention include selecting a starter vocabulary, receiving voice communications from a user, and modifying the starter vocabulary to generate a personalized lexicon. Aspects of the invention also include analyzing and categorizing human voice according to a plurality of characteristics, and creating a spoken genome database.

15 Claims, 9 Drawing Sheets

(51) Int. Cl.
  *G06F 16/435* (2019.01)
  *G10L 13/027* (2013.01)
  *G10L 13/08* (2013.01)
  *G10L 13/047* (2013.01)

(56) References Cited

U.S. PATENT DOCUMENTS

| | | | |
|---|---|---|---|
| 7,089,499 | B2 | 8/2006 | Steichen et al. |
| 7,127,398 | B1* | 10/2006 | Yamagishi .......... G10L 15/1815 704/270 |
| 7,949,526 | B2 | 5/2011 | Ju et al. |
| 8,073,854 | B2* | 12/2011 | Whitman .............. G06F 16/683 707/749 |
| 8,903,716 | B2 | 12/2014 | Chen et al. |
| 8,918,411 | B1 | 12/2014 | Latif |
| 9,390,706 | B2 | 7/2016 | Gustafson et al. |
| 9,471,200 | B2 | 10/2016 | Dellinger |
| 9,607,098 | B2 | 3/2017 | Yang |
| 9,710,563 | B2 | 7/2017 | Deng |
| 9,817,625 | B1 | 11/2017 | Chun |
| 9,858,340 | B1* | 1/2018 | Frey ................... G06K 9/00765 |
| 10,140,591 | B2 | 11/2018 | Panigrahi |
| 10,162,900 | B1 | 12/2018 | Chatterjee |
| 10,169,684 | B1 | 1/2019 | Nathan |
| 2001/0014891 | A1* | 8/2001 | Hoffert ................... G06F 16/40 |
| 2001/0041977 | A1* | 11/2001 | Aoyagi ..................... G06F 3/16 704/246 |
| 2002/0029203 | A1 | 3/2002 | Pelland et al. |
| 2002/0194601 | A1* | 12/2002 | Perkes ................ G06F 16/9535 725/44 |
| 2003/0167167 | A1 | 9/2003 | Gong |
| 2006/0069546 | A1* | 3/2006 | Rosser .................... G10L 15/22 704/9 |
| 2007/0282848 | A1* | 12/2007 | Kiilerich .............. G06F 16/4387 |
| 2008/0022208 | A1* | 1/2008 | Morse ................. G11B 27/105 715/727 |
| 2008/0065387 | A1* | 3/2008 | Cross, Jr. .............. G10L 17/005 704/270 |
| 2008/0096533 | A1 | 4/2008 | Manfredi et al. |
| 2008/0177616 | A1 | 7/2008 | Nemirofsky et al. |
| 2009/0217178 | A1 | 8/2009 | Niyogi |
| 2009/0228281 | A1* | 9/2009 | Singleton ................ G10L 15/08 704/275 |
| 2009/0318777 | A1* | 12/2009 | Kameyama ....... G06F 16/24575 600/301 |
| 2009/0319449 | A1 | 12/2009 | Gamon |
| 2010/0030798 | A1* | 2/2010 | Kumar .................. G06F 16/954 707/737 |
| 2011/0276513 | A1 | 11/2011 | Erhart |
| 2011/0288897 | A1 | 11/2011 | Erhart |
| 2012/0185544 | A1 | 7/2012 | Chang |
| 2012/0254152 | A1 | 10/2012 | Park |
| 2013/0019163 | A1 | 1/2013 | Thompson |
| 2013/0024017 | A1* | 1/2013 | Whikehart ............ B60R 16/037 700/94 |
| 2013/0024407 | A1 | 1/2013 | Thompson |
| 2013/0060860 | A1 | 3/2013 | Myslinski |
| 2013/0086072 | A1 | 4/2013 | Peng |
| 2013/0097625 | A1* | 4/2013 | Thorwirth ............... G11B 27/28 725/25 |
| 2013/0152092 | A1* | 6/2013 | Yadgar ................... G10L 15/19 718/102 |
| 2013/0158987 | A1 | 6/2013 | Xing |
| 2013/0159054 | A1 | 6/2013 | Evans |
| 2013/0191395 | A1 | 7/2013 | Dowlaty |
| 2013/0218862 | A1 | 8/2013 | Ghosh |
| 2013/0227016 | A1 | 8/2013 | Risher |
| 2013/0254231 | A1 | 9/2013 | Decker |
| 2013/0297581 | A1 | 11/2013 | Ghosh |
| 2013/0297694 | A1 | 11/2013 | Ghosh |
| 2013/0304818 | A1 | 11/2013 | Brumleve |
| 2013/0325977 | A1 | 12/2013 | Drews |
| 2014/0012800 | A1 | 1/2014 | Oh |
| 2014/0012855 | A1 | 1/2014 | Firat |
| 2014/0040371 | A1 | 2/2014 | Gurevich |
| 2014/0068515 | A1 | 3/2014 | Atacik |
| 2014/0074551 | A1 | 3/2014 | Setayesh |
| 2014/0081636 | A1 | 3/2014 | Erhart |
| 2014/0115465 | A1* | 4/2014 | Lee ...................... G11B 27/031 715/716 |
| 2014/0122622 | A1 | 5/2014 | Castera |
| 2014/0147048 | A1 | 5/2014 | Yang |
| 2014/0149409 | A1 | 5/2014 | Lamba |
| 2014/0188830 | A1 | 7/2014 | Deville |
| 2014/0195544 | A1* | 7/2014 | Whitman ............... G06F 16/435 707/744 |
| 2014/0236673 | A1 | 8/2014 | Smith |
| 2014/0279184 | A1 | 9/2014 | Lai |
| 2014/0280060 | A1 | 9/2014 | Campbell |
| 2014/0280168 | A1 | 9/2014 | Setayesh |
| 2014/0280181 | A1* | 9/2014 | Rodger ................ G06F 16/4387 707/740 |
| 2014/0289006 | A1 | 9/2014 | Palmer |
| 2014/0337257 | A1 | 11/2014 | Chatterjee |
| 2014/0337320 | A1 | 11/2014 | Hernandez |
| 2014/0337421 | A1 | 11/2014 | Edlund |
| 2014/0358930 | A1 | 12/2014 | Lerman |
| 2015/0052138 | A1* | 2/2015 | Sutton ..................... G06F 16/35 707/737 |
| 2015/0086949 | A1 | 3/2015 | Li et al. |
| 2015/0134456 | A1* | 5/2015 | Baldwin ................. H04W 8/18 705/14.64 |
| 2015/0169758 | A1 | 6/2015 | Assom |
| 2015/0178267 | A1 | 6/2015 | Heo |
| 2015/0220513 | A1* | 8/2015 | Lyman .................... G10L 15/18 704/9 |
| 2015/0220633 | A1* | 8/2015 | Fuzell-Casey ......... G06Q 10/00 707/748 |
| 2015/0244829 | A1 | 8/2015 | Ethington |
| 2015/0254230 | A1 | 9/2015 | Papadopoullos |
| 2015/0254338 | A1* | 9/2015 | Cheluvaraja ........... G10L 25/51 707/661 |
| 2015/0356093 | A1 | 12/2015 | Abbas |
| 2016/0004686 | A1 | 1/2016 | Kruglick |
| 2016/0004773 | A1* | 1/2016 | Jannink ................... G06F 16/61 707/741 |
| 2016/0012454 | A1 | 1/2016 | Newton |
| 2016/0019552 | A1 | 1/2016 | Trivedi |
| 2016/0021293 | A1 | 1/2016 | Jensen |
| 2016/0063098 | A1 | 3/2016 | Kawanaka |
| 2016/0085869 | A1 | 3/2016 | Magdy |
| 2016/0092793 | A1 | 3/2016 | Garrow |
| 2016/0105768 | A1 | 4/2016 | Pinard |
| 2016/0148215 | A1 | 5/2016 | Von Teichman |
| 2016/0162575 | A1 | 6/2016 | Eck |
| 2016/0162582 | A1 | 6/2016 | Chatterjee |
| 2016/0162585 | A1 | 6/2016 | Lee |
| 2016/0179922 | A1 | 6/2016 | Crupi |
| 2016/0189037 | A1 | 6/2016 | Pereg et al. |
| 2016/0203224 | A1 | 7/2016 | Yu |
| 2016/0212071 | A1 | 7/2016 | Hannah |
| 2016/0239581 | A1 | 8/2016 | Jaidka |
| 2016/0239763 | A1 | 8/2016 | Krause |
| 2016/0246886 | A1 | 8/2016 | Chakraborty |
| 2016/0253685 | A1 | 9/2016 | Lubeck |
| 2016/0275107 | A1 | 9/2016 | Goodwin |
| 2016/0292157 | A1 | 10/2016 | Zhang |
| 2016/0292204 | A1 | 10/2016 | Klemm |
| 2016/0292595 | A1 | 10/2016 | Williams |
| 2016/0307284 | A1 | 10/2016 | Parsons |
| 2016/0321243 | A1 | 11/2016 | Walia |
| 2016/0379251 | A1 | 12/2016 | Sanjay |
| 2017/0011029 | A1 | 1/2017 | Chatterjee |
| 2017/0032434 | A1 | 2/2017 | Ker |
| 2017/0039204 | A1 | 2/2017 | Blanchflower |
| 2017/0041365 | A1 | 2/2017 | Harris |
| 2017/0061476 | A1 | 3/2017 | Manouchehri |
| 2017/0075990 | A1 | 3/2017 | Leu |
| 2017/0090734 | A1 | 3/2017 | Fitzpatrick |
| 2017/0091289 | A1 | 3/2017 | Chazulike |
| 2017/0105031 | A1 | 4/2017 | Sheppard |
| 2017/0109838 | A1 | 4/2017 | Byron |

(56) References Cited

U.S. PATENT DOCUMENTS

| | | | |
|---|---|---|---|
| 2017/0116986 A1* | 4/2017 | Weng | G10L 15/22 |
| 2017/0161282 A1 | 6/2017 | Kemme | |
| 2017/0168751 A1 | 6/2017 | Stevens | |
| 2017/0177623 A1 | 6/2017 | Chen | |
| 2017/0193611 A1 | 7/2017 | Vassilev | |
| 2017/0206604 A1 | 7/2017 | Al-Masoud | |
| 2017/0212942 A1 | 7/2017 | Boileau | |
| 2017/0220577 A1 | 8/2017 | Pal | |
| 2017/0220670 A1 | 8/2017 | Caldwell | |
| 2017/0262522 A1 | 9/2017 | Ranjan | |
| 2017/0277662 A1 | 9/2017 | Saliba | |
| 2017/0316082 A1 | 11/2017 | McQueary | |
| 2017/0316519 A1 | 11/2017 | Wang | |
| 2017/0322924 A1 | 11/2017 | Takano | |
| 2017/0337251 A1 | 11/2017 | Kordasiewicz | |
| 2017/0358302 A1* | 12/2017 | Orr | G10L 15/1815 |
| 2018/0018309 A1 | 1/2018 | Chun | |
| 2018/0025069 A1 | 1/2018 | Kataria | |
| 2018/0032518 A1 | 2/2018 | Kordasiewicz | |
| 2018/0053116 A1 | 2/2018 | Cai | |
| 2018/0053118 A1 | 2/2018 | Kataria | |
| 2018/0084310 A1 | 3/2018 | Katz | |
| 2018/0096436 A1 | 4/2018 | Pal | |
| 2018/0097762 A1 | 4/2018 | Garcia | |
| 2018/0113978 A1 | 4/2018 | Kafai | |
| 2018/0121555 A1 | 5/2018 | Li | |
| 2018/0210911 A1* | 7/2018 | Gamble | H04W 4/12 |
| 2018/0225265 A1 | 8/2018 | Fitzpatrick | |
| 2018/0225372 A1 | 8/2018 | Lecue | |
| 2018/0255159 A1 | 9/2018 | Cohen | |
| 2018/0285738 A1 | 10/2018 | Bouton | |
| 2018/0336210 A1 | 11/2018 | Bourgeois | |
| 2018/0336222 A1 | 11/2018 | Bourgeois | |
| 2018/0359089 A1 | 12/2018 | Innes | |
| 2019/0012374 A1 | 1/2019 | Petroni | |
| 2019/0034295 A1 | 1/2019 | Bourgeois | |
| 2019/0080349 A1 | 3/2019 | Berzin | |

OTHER PUBLICATIONS

Christopher J. Hardee et al., "Adaptive Digital Assistant and Spoken Genome", U.S. Appl. No. 15/497,536, filed Apr. 26, 2017.

List of IBM Patents or Patent Applications Treated as Related; (Appendix P), Filed Sep. 20, 2018, 2 pages.

Guha et al., "User Modeling for a Personal Assistant," WSDM'15, Feb. 2-6, 2015, Shanghai, China, pp. 275-284.

Saghir et al, "An Intelligent Assistant for Context-Aware Adaptation of Personal Communications," IEEE, 2007, Evry, France, pp. 2537-2542.

Santos et al., "Intelligent Personal Assistant Based on Internet of Things Approaches," IEEE Systems Journal, 2016, IEEE, pp. 1-10.

\* cited by examiner

US 10,607,608 B2

ADAPTIVE DIGITAL ASSISTANT AND SPOKEN GENOME

DOMESTIC PRIORITY

This application is a division of and claims priority from U.S. patent application Ser. No. 15/497,536, filed on Apr. 26, 2017, the entire contents of which are incorporated herein by reference.

BACKGROUND

The present invention relates generally to a digital assistant and spoken genome, and more specifically to a context sensitive adaptive digital assistant for personalized interaction and spoken genome for characterization and analysis of human voice.

Personal digital assistants, including digital assistants associated with smart devices, are increasingly becoming integrated into the daily lives of the general population. Such personal digital assistants can readily facilitate looking up information, scheduling appointments, setting task lists, and the like through vocal requests by the user. Conventional personal digital assistants, although increasingly popular with smart device users, lack personalization. In addition, although people can enjoy music and the sound their own voice, they may yet resort to silent texting and internet posting for communication. Qualification of sound and voice characteristics could aid not only the consumer, but also the provider of consumer content.

SUMMARY

In accordance with embodiments of the invention, a computer-implemented method for personalized digital interaction includes selecting a starter vocabulary from a starter vocabulary set. The method also includes receiving a plurality of user voice communications from a user. The method also includes generating a frequent word list based at least in part on the plurality of user voice communications. The method also includes modifying the starter vocabulary with a plurality of words from the frequent word list to generate a personalized lexicon. The method also includes generating a personalized verbal output based at least in part on the personalized lexicon.

In accordance with embodiments of the invention, a computer program product for characterization and analysis of human voice includes a computer readable storage medium readable by a processing circuit and storing program instructions for execution by the processing circuit for performing a method. The method includes receiving a plurality of media files, wherein the plurality of media files include spoken words. The method also includes categorizing the plurality of media files according to spoken genome properties to create a categorized spoken genome database. The method also includes receiving a user media preference. The method also includes determining a user media profile based at least in part on the user media preference, wherein the media profile includes a spoken genome property. The method also includes generating a media recommendation based at least in part on the user media profile and the categorized spoken genome database.

In accordance with embodiments of the invention, a processing system for characterization and analysis of human voice includes a processor in communication with one or more types of memory. The processor is configured to receive a first reference voice sampling, wherein the first reference voice sampling includes a plurality of reference voices corresponding to a first known reference quality. The processor is also configured to analyze the first voice sampling to determine a spoken genome property corresponding to the first known reference quality.

BRIEF DESCRIPTION OF THE DRAWINGS

The subject matter of embodiments of the invention is particularly pointed out and distinctly claimed in the claims at the conclusion of the specification. The foregoing and other features and advantages of the one or more embodiments described herein are apparent from the following detailed description taken in conjunction with the accompanying drawings in which:

DETAILED DESCRIPTION

Figure 1:
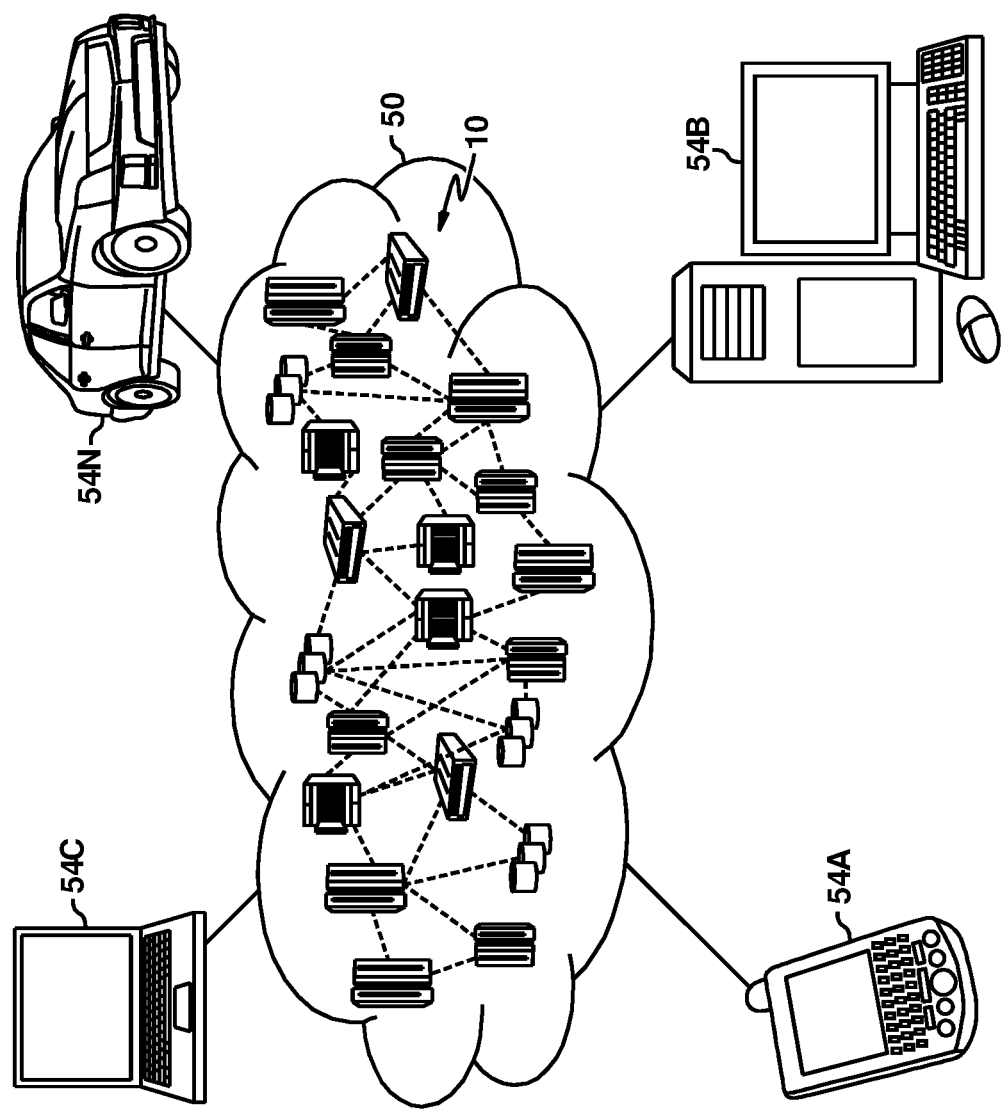
FIG. 1 depicts a cloud computing environment according to an embodiment of the present invention.

Embodiments of the invention relate to systems and methods for characterization, analysis, and personalization of voice.

A large appeal of personal digital assistants is that they desirably reduce or even eliminate the need to type information into search engines and scheduling programs, and in some instances, they can provide shortcuts to commands associated with a smart device. Conventional personal digital assistants, although increasingly popular with smart device users, lack personalization. Traditional personal digital assistants have the same characteristics for each user, including, for example, speaking with the same lexicon and same degree of politeness for every person serviced by the personal digital assistant. This lack of personalization, however, is undesirable for a user of such assistants. For example, a user who interacts multiple times daily with a personal digital assistants could prefer characteristics that are less automated to increase the quality of and frequency of interaction and to achieve a communication that feels more like a human-human interaction than a human-machine interaction.

Embodiments of the invention include a personalized digital assistant that can adapt its lexicon and vocal mannerisms for an individual user. In some embodiments of the invention, personal digital assistants are personalized to an individual based at least in part on one or more characteristics and can further adapt with continued use.

With increased emphasis on texting for communication and sharing thoughts and feelings through posting of text and pictures on social media, the emphasis and focus on sound and the human voice has decreased. Although people can enjoy music and the sound their own voice, they may yet resort to silent texting and internet posting for communication. However, wording expressed by people vocally, including aspects such as cadence, tonality, dynamics and wording, can have a potentially large impact on human emotions and actions. For example, characteristics of sound and voice can impact an individual's decision of whether to watch a commercial or television program. Although actions and emotions can be guided by how much people like what they hear, individuals can lack an ability to pre-determine whether what individuals hear will be appealing or influential.

Various aspects of sound characteristics, such as cadence, tonality, dynamics, and wording choice, can have a potentially dramatic impact on user emotion and activity. Voice and sound characteristics can affect how listeners perceive, appreciate, and pay attention to a speaker. For example, listening to a voice with a low volume and slow cadence can be more likely to induce sleepiness and feelings of relaxation than listening to a voice with a high volume and fast cadence. Moreover, individual listeners or categories of listeners can have their own sound preferences, which can be known or unknown to a given individual. For example, a female voice at a given pitch could be more appealing or influential to a 30-year old male than a 60-year old female and, thus, could be a better choice for a truck advertisement. Similarly, speaking cadence can be an important characteristic for listening ability but also as an indicator of content of a viewable program. Voice and sound characteristics, if known and understood, can be used for targeted advertising, tailored content perception, for example in educational contexts, and a variety of other purposes.

Embodiments of the invention include a spoken genome that categorizes voices based at least in part on pitch, cadence, tonality, rhythm, accent, timing, elocution, and related or similar characteristics that can affect how listeners perceive, appreciate, or pay attention to a speaker. Embodiments of the invention can guide listeners and content providers to content they will like. Embodiments of the invention can facilitate gaining the interest, of target audiences, for example, consumers, television viewers, or students. Thus, embodiments of the invention can provide benefits to advertisers, educators, and television program providers, who can desire to provide subtly targeted content. In some embodiments of the invention, a user can use a spoken genome to identify content that is likely to be of interest. For example, a fan of television programming that provides characteristic rapid-fire clever dialogue, can use the spoken genome to find other television programming with similar rapid-fire dialogue. In some embodiments of the invention, a spoken genome can qualify advertisements and television shows. In some embodiments of the invention, a spoken genome can guide marketers and producers as they set out to target certain audiences.

It is understood in advance that although this description includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
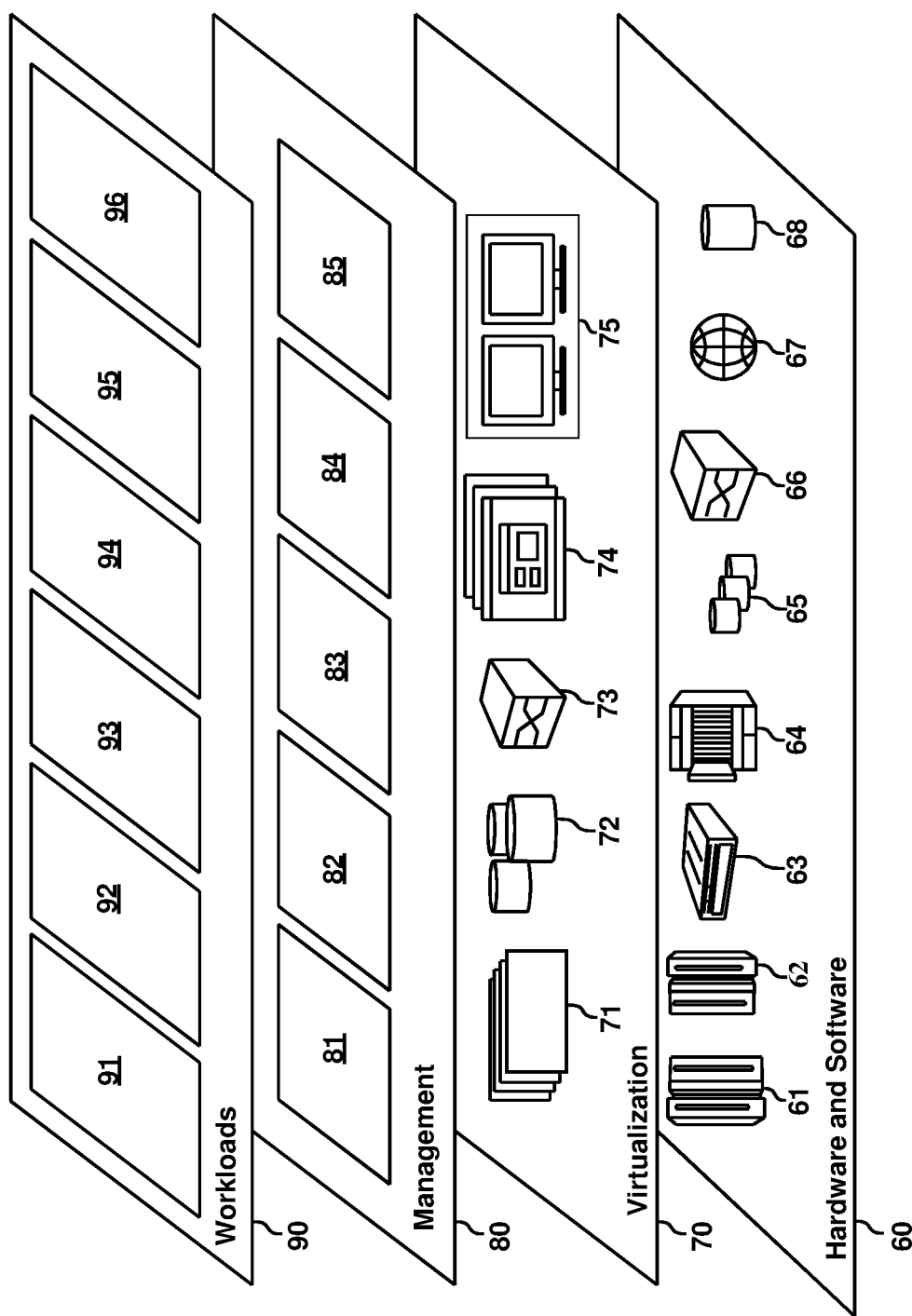
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and voice categorization and personalization 96.

Figure 3:
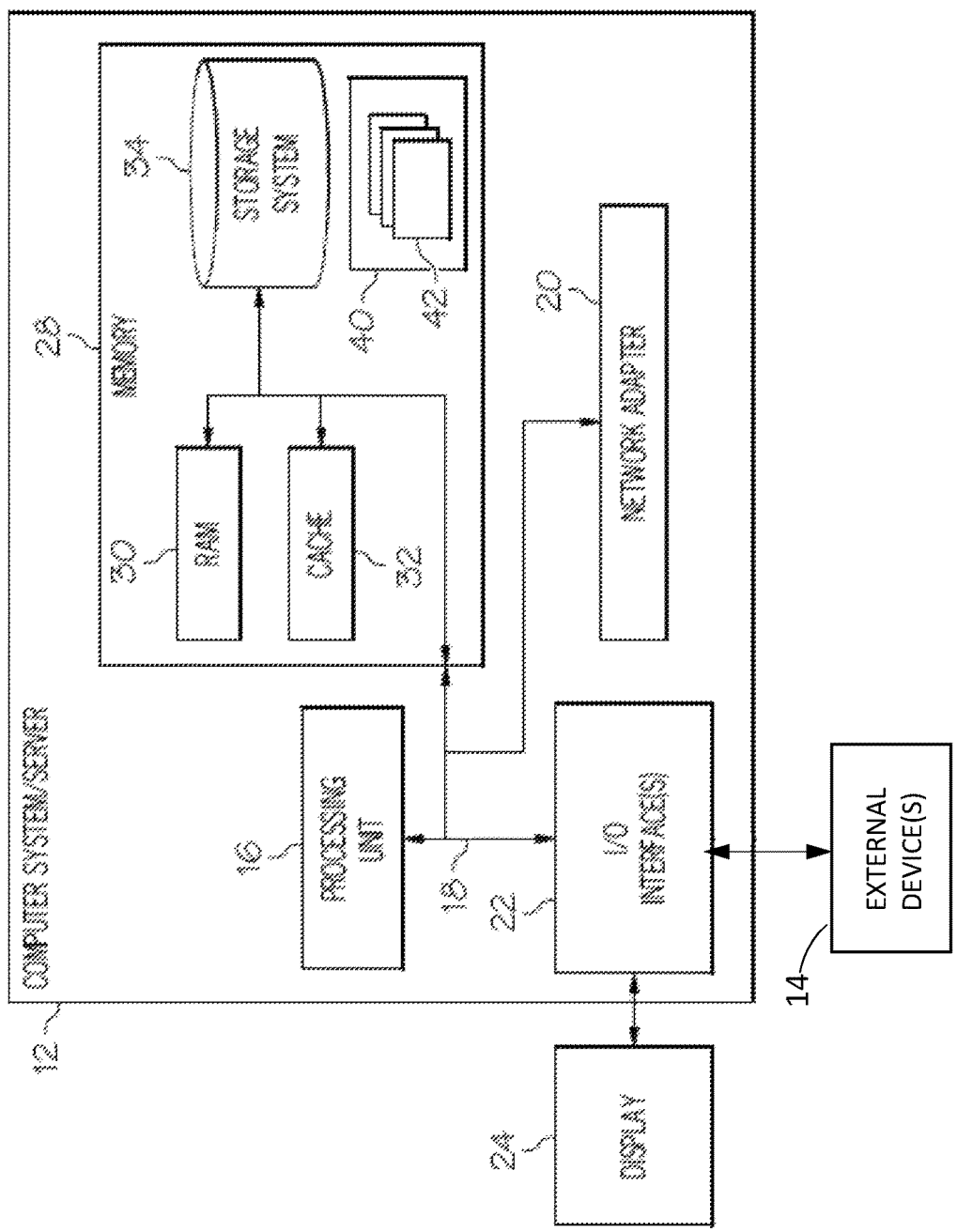
FIG. 3 depicts a computing node according to one or more embodiments of the present invention.

Referring now to FIG. 3, a schematic of a cloud computing node 100 included in a distributed cloud environment or cloud service network is shown according to a non-limiting embodiment. The cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 3, computer system/server 12 in cloud computing node 100 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
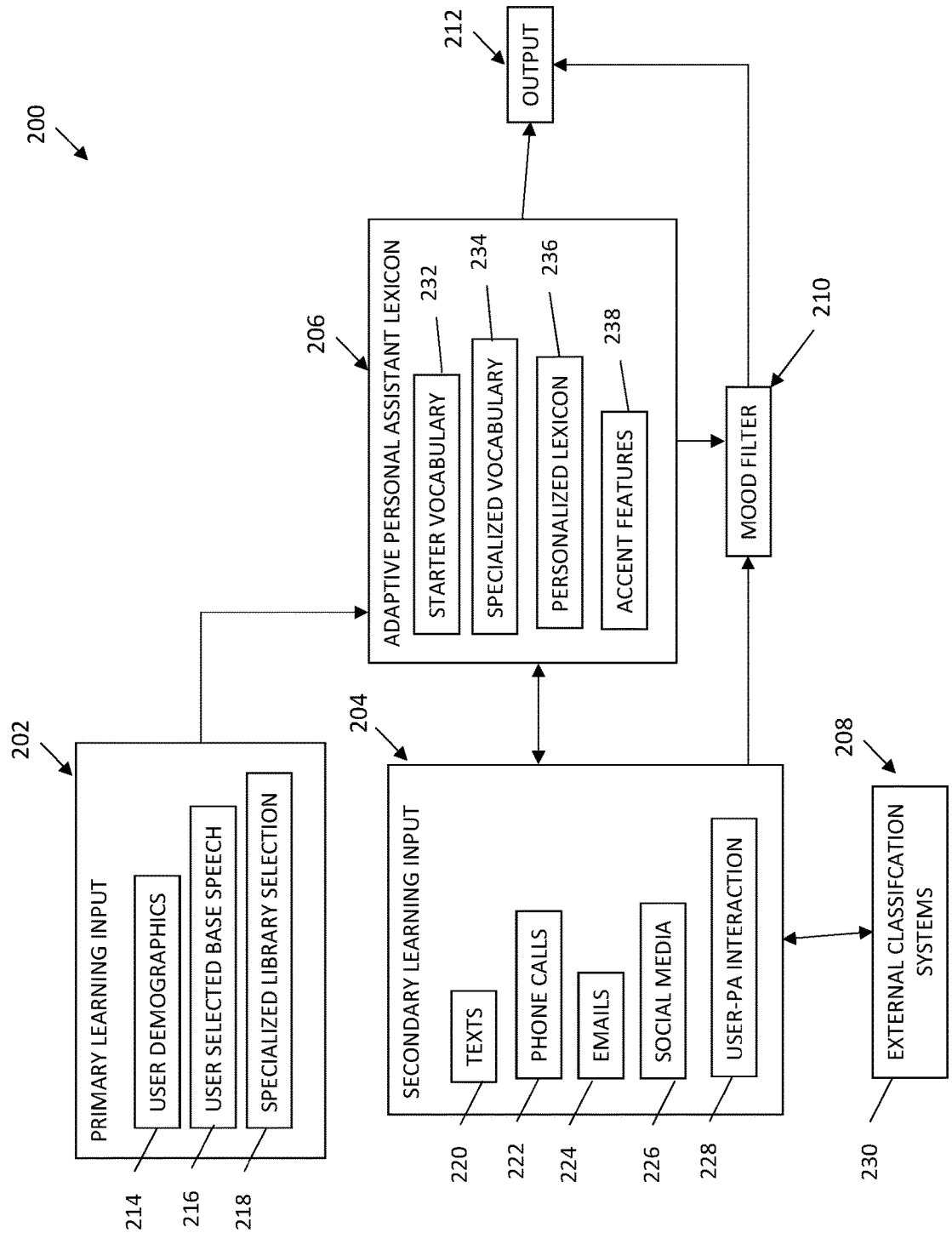
FIG. 4 depicts a diagram illustrating an exemplary adaptive digital assistant system according to one or more embodiments of the present invention.

Turning now to a more detailed description of embodiments of the present invention, FIG. 4 depicts a diagram illustrating an exemplary adaptive digital assistant system 200. The system 200 includes a primary learning input 202. The primary learning input 202 includes components that can be used to establish a starter vocabulary 232. For example, the primary learning input 202 can include any general data that can be used to select from a defined subset of starter vocabularies. For example, the primary learning input can include user demographics 214, such as age, gender, geographic location, marital status, ethnicity, or educational level. In some embodiments of the invention, the primary learning input 202 can include a user selected base speech 216. For example, a user can select their own base speech vocabulary, upon system start up, from a list of predefined starter vocabularies, such as teenage girl, middle aged woman, man aged 60 to 70, and the like. The primary learning input 202 can include, in some embodiments of the invention, a specialized library selection 218. For example, a user can be prompted, upon system start up, to optionally select a specialized library corresponding to a specialized interest or occupation, such as a music specialization or an engineering, medical or other occupation. A specialized library selection 218, for instance, can aid in enhancement or supplementation of the base vocabulary, providing greater understanding of the user commands by the personal assistant and, thereby, enhanced functionality.

In some embodiments of the invention, the system 200 includes a secondary learning input 204. The secondary learning input 204 can include a variety of sources of vocabulary and grammatical expression involving the user or others in frequent contact with the user, such as user friends, family, and colleagues. In some embodiments of the invention, the system 200 can prompt a user for permission to access secondary sources. Secondary learning input 204 can include text messages 220, including text messages sent by the user or text messages sent to the user. The system 200 can, for example, analyze text messages for frequent words or phrases. In some embodiments of the invention, text messages 220 include a subset of all text messages received by the user, such as text messages sent by a pre-determined list of individuals or text messages from frequent senders. Secondary learning input 204 can include phone calls 222. For example, the system 200 could receive user permission to access the input and output of a smartphone and can monitor conversations for frequently used words or phrases, for voice accents, vocal mannerisms, and specialized vocabulary. Secondary learning input 204 can include email messages 224, including email messages sent by the user or email messages sent to the user. The system 200 can, for example, analyze email messages for frequent words or phrases. In some embodiments of the invention, email messages 224 include a subset of all email messages received by the user, such as text messages sent by a pre-determined list of individuals or text messages from frequent senders. Secondary learning input 204 can include social media 226 access. For example, the system 200 could receive user permission to access social media postings by a user or the user's friends or family and can monitor posts for frequently used words or phrases, or specialized vocabulary.

In some embodiments of the invention, secondary learning input 204 includes user-personal assistant interaction 228. User personal assistant interaction 228 includes all voice communications a user provides to the personal assistant, including verbal commands and statements, such as scheduling requests, meeting requests, research requests, requests to perform tasks such as writing emails, text messages, or placing telephone calls, comments on results from the personal assistant, responses to personal assistant output, such as responses to requests for clarification and follow up questions by the personal assistant, and the like.

In some embodiments of the invention, the system 200 includes external classification systems 230. For example, when the system 200 encounters an unknown word or phrase, the system 200 can consult external classification systems 230, such as web-based dictionaries or urban dictionaries, to determine a meaning or characterization for the word or phrase.

As is shown, the system 200 can include an adaptive personal assistant lexicon 206. The adaptive personal assistant lexicon can analyze the primary learning input and the secondary learning input to provide a personalized verbal output. In some embodiments of the invention, the adaptive personal assistant lexicon 206 includes a starter vocabulary 232. The adaptive personal assistant lexicon 206 optionally includes a specialized vocabulary 234. The adaptive personal assistant lexicon 206 includes a personalized lexicon 236. The personalized lexicon 236 can be generated based at least in part on the primary learning input 202, the secondary learning input 204, and external classification systems 230. The personalized lexicon 236 can be continuously or periodically modified or updated, for example, through continuous or periodic receipt of secondary learning input 204. In some embodiments of the invention, the adaptive personal assistant lexicon 206 includes accent features 238. Accent features 238 can include pre-defined vocabulary or pronunciation features, such as features associated with a known geographic region (southern United States, Australia, Canada, etc.). In some embodiments of the invention, accent features 238 can include vocabulary or pronunciation features derived from analyzing speech from the user and optionally the user's friends and family.

The system 200 includes an output 212 including vocal digital output from the personal assistant. The output 212 can include any output requested by a user of a personal digital assistant, such as responses to request for information, such as requests or directions, schedules, internet searches, weather, and the like; responses for requests to perform tasks, such as calendaring, telephoning, sending text messages or emails, and the like; requests for clarification; reminders of upcoming events, etc. In some embodiments of the invention, the adaptive personal assistant lexicon 206 can adapt the personal assistant output to include words and vocal mannerisms of the user. For example, the personal digital assistant can adapt its speech in order to approximate a relationship of a friend or trusted advisor.

Figure 5:
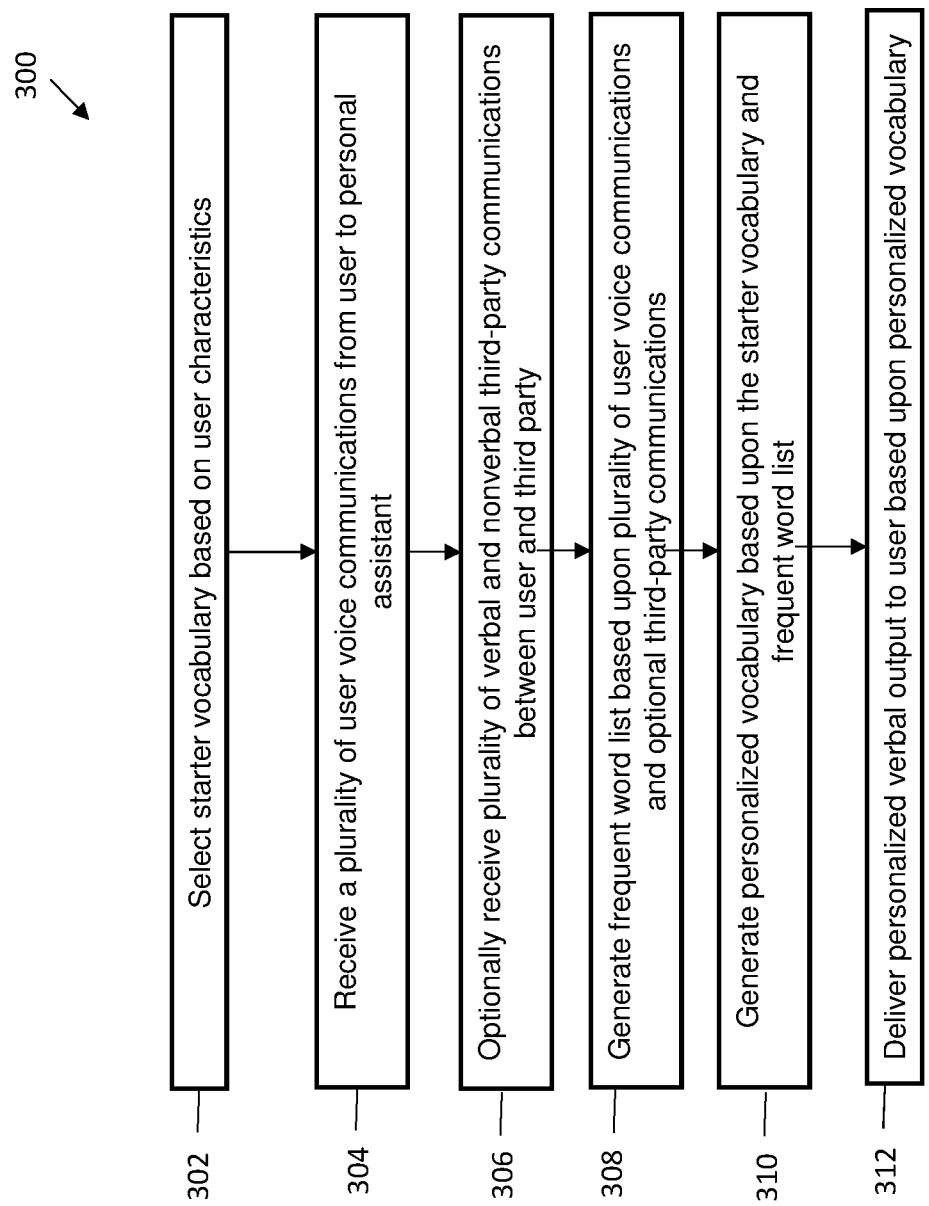
FIG. 5 depicts a flow diagram illustrating a method for personalized digital interaction according to one or more embodiments of the present invention.

FIG. 5 depicts a flow diagram illustrating a method 300 for personalized digital interaction according to one or more embodiments of the present invention. The method 300 includes, as shown at block 302, selecting a starter vocabulary based at least in part on user characteristics. The method 300 also includes, as shown at block 304, receiving a plurality of user voice communications from a user to a personal assistant. The method 300 also includes, as shown at block 306, optionally receiving a plurality of verbal and nonverbal third-party communications between a user and a third-party. For example, the third-party communications can include text messages, social media posts, telephone conversations, or emails between a user and a third-party, such as a friend, colleague, acquaintance, co-worker, or family member. The method 300 also includes, as shown at block 308, generating a frequent word list based at least in part on a plurality of user voice communications and optional third-party communications. The method 300 also includes, as shown at block 310, generating a personalized vocabulary based at least in part on the starter vocabulary and frequent word list. The method 300 also includes, as shown at block 312, delivering a personalized verbal output to a user based at least in part on the personalized vocabulary.

In some embodiments of the invention, methods for personalized digital interaction include receiving a secondary learning input from a smart device and modifying the personalized vocabulary based at least in part on the secondary learning input.

In some embodiments of the invention, selecting the starter vocabulary includes receiving a user demographic data set. The user demographic data set can include any information helpful to determining an initial vocabulary, such as age, gender, geographic location, and the like. In some embodiments of the invention, selecting the starter vocabulary includes comparing a user demographic data set to a plurality of characteristics of a starter vocabulary set. The starter vocabulary set can include base vocabularies of designated age groups, genders, and the like. Selecting the starter vocabulary can also include determining based at least in part on the comparison, a preferred starter vocabulary.

In some embodiments of the invention, methods for personalized digital interaction include analyzing a voice command from a user to determine the user's mood and adjusting a characteristic of the personalized verbal output based at least in part on the mood. For example, a mood filter can analyze the timbre, tenor, and inflection of words and identify the mood of the speaker. The adaptive digital assistant can optionally modify the verbal output delivery to better match the mood of the user. For instance, if a speaker is very dynamic and loud and laughing, the adaptive digital assistant can be dynamic and funny. If a speaker is sober and speaks slowly with little inflection or dynamics, the adaptive digital assistant can provide a relatively muted delivery output. In some embodiments of the invention, a user can set mood filter preferences, for example a user can set the mood filter to operate only upon request or during specified time intervals. In some embodiments of the invention, methods for personalized digital interaction include selecting a set of accent features and adjusting a characteristic of the personalized verbal output based at least in part on the accent features.

Embodiments of the invention provide a voice characterization system. Voice characterization systems and methods according to embodiments of the invention can aid advertisers, television producers, and other providers of spoken content in reaching an appealing to target audiences.

Characterization of music, such as in the case of the music genome project, can include analysis, characterization, and grouping of songs. Characterization of speech, on the other hand, presents a number of complexities not present in the case of music. For example, in speech, pitch variation can form part of a more complex set of modulations known as prosody. Prosody includes speech parameters that can apply on a variety of levels, including the level of a syllable, word, phrase, or sentence, and moreover, can involve distinguishing word meanings in tone languages, distinguishing questions from statements, signaling emotion, such as irony and sarcasm, and other similar nuances of speech. Such characteristics and nuances, however, can play a role in a listener's overall preference or dislike for an instance of spoken word.

Figure 6:
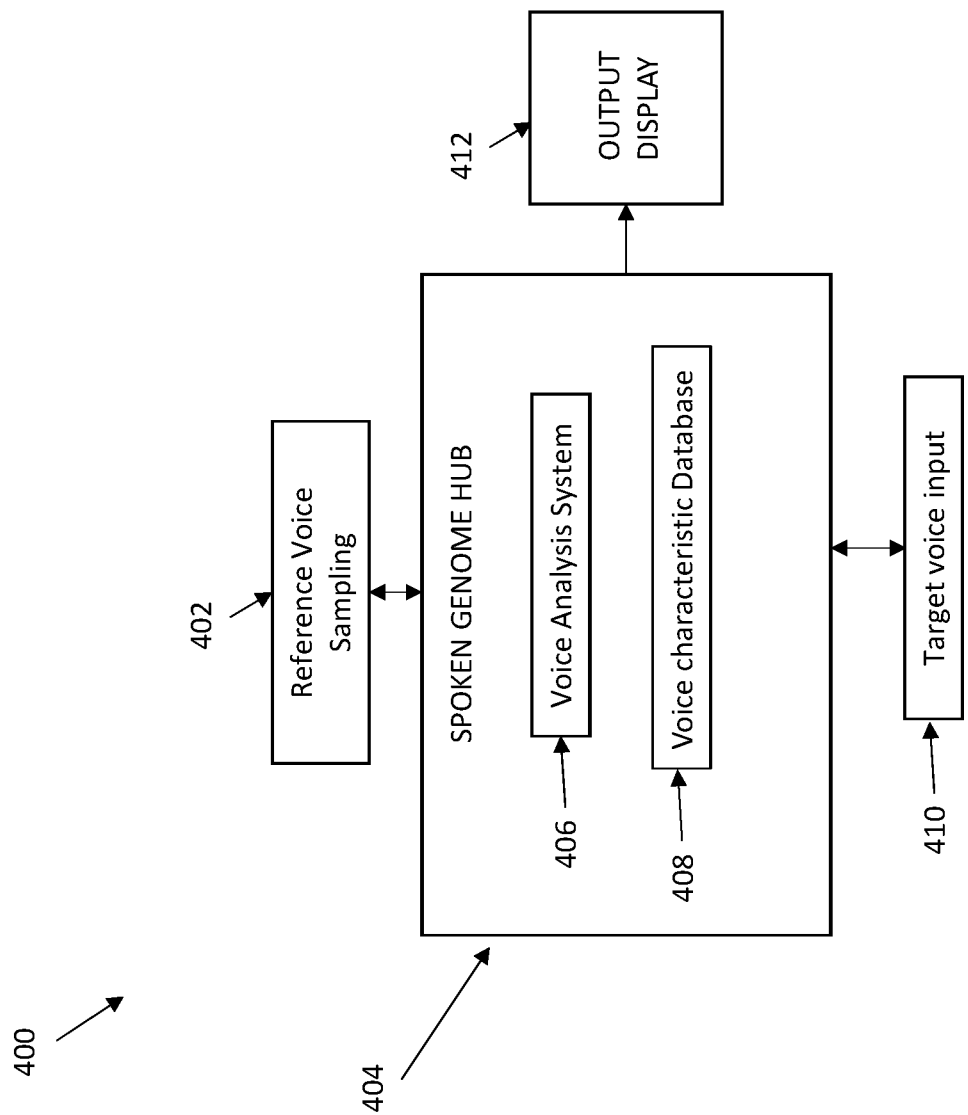
FIG. 6 depicts a diagram illustrating an exemplary voice characterization system according to one or more embodiments of the present invention.

FIG. 6 depicts a diagram illustrating an exemplary voice characterization system 400 according to one or more embodiments of the present invention. The system 400 can include a reference voice sampling 402. The system 400 can also include a spoken genome hub 404. The spoken genome hub 404 can include a voice analysis system 406 and a voice characteristic database 408. In some embodiments of the invention, the system 400 also includes a target voice input 410. Target voice input 410 can include a voice input that is desired to be analyzed or compared to reference voice samplings or characteristics in the voice characteristic database 408. In some embodiments of the invention, the system 400 includes an output display 412.

Reference voice sampling 402 can include a plurality of voice data files associated with a variety of known characteristics. For example, the voice sampling 402 can include a plurality of voices having different genders, ages, socio-economic characteristics, educational levels, or any other quality that could be useful for categorization in a consumer or media context, an advertising context, an educational context, and the like.

Spoken genome hub 404 can include a voice analysis system 406 that can analyze human voice and categorize voices based at least in part on gender, pitch, cadence, tonality, rhythm, accent, timing, slurring, elocution, and other similar or related characteristics that can affect how a listener perceives, appreciates, or pays attention to a speaker. Spoken genome hub 404 can include a voice characterization database 408 that can include a plurality of reference qualities and associated voice characteristics.

Figure 7:
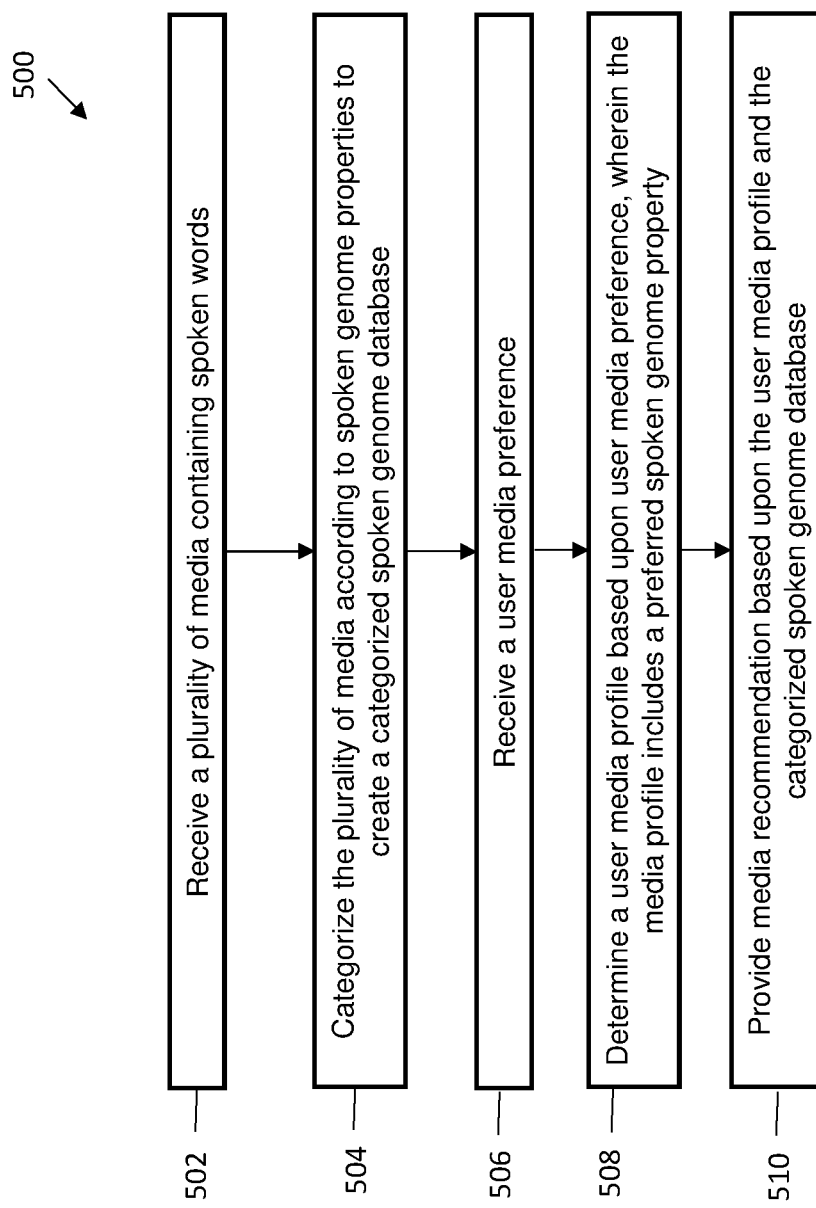
FIG. 7 depicts a flow diagram illustrating a method for characterization and analysis of human voice according to one or more embodiments of the present invention.

FIG. 7 depicts a flow diagram illustrating a method for characterization and analysis of human voice 500 according to one or more embodiments of the present invention. The method 500 includes, as shown at block 502, receiving a plurality of media containing spoken words. The method 500 also includes, as shown at block 504, categorizing the plurality of media according to spoken genome properties to create a categorized spoken genome database. The method 500 also includes, as shown at block 506, receiving a user media preference. The method 500 also includes, as shown at block 508, determining a user media profile based at least in part on a user media preference, wherein the user media profile includes a preferred spoken genome property. The method 500 also includes, as shown at block 510, providing a media recommendation based at least in part on the user media profile and the categorized spoken genome database.

Figure 8:
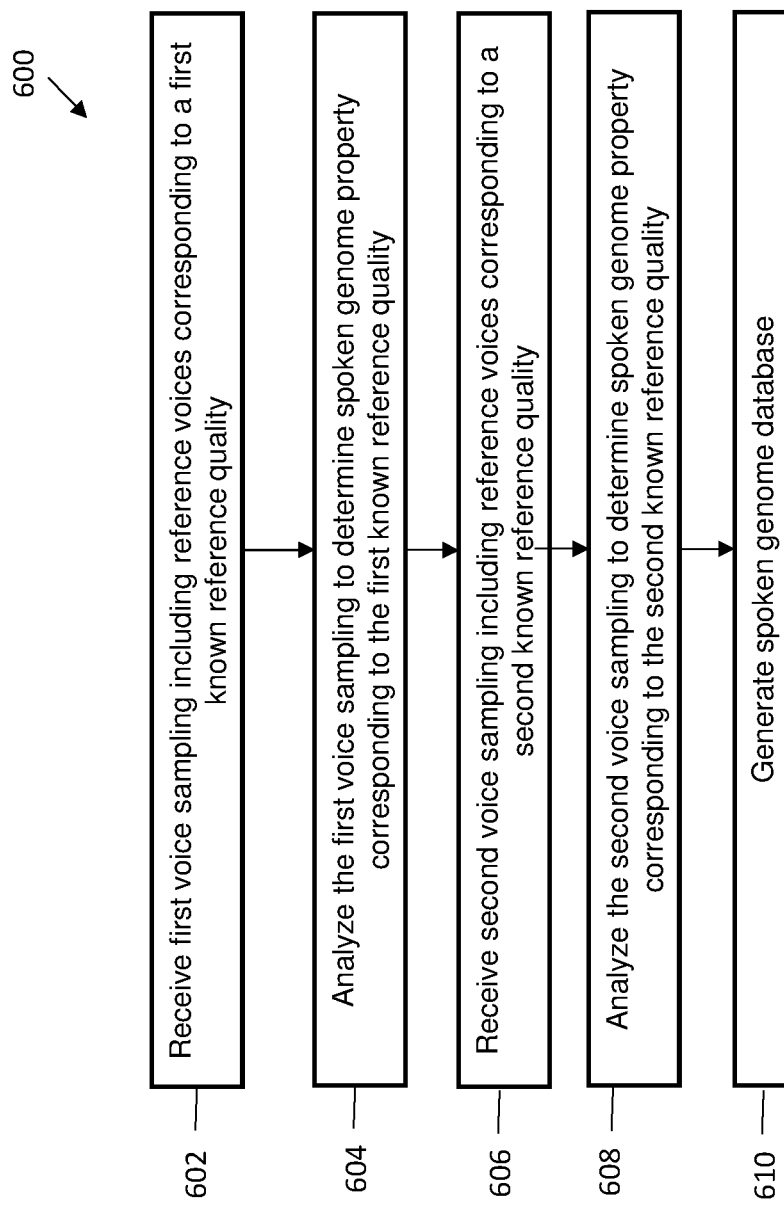
FIG. 8 depicts a flow diagram illustrating a method for characterization and analysis of human voice according to one or more embodiments of the present invention.
Figure 9:
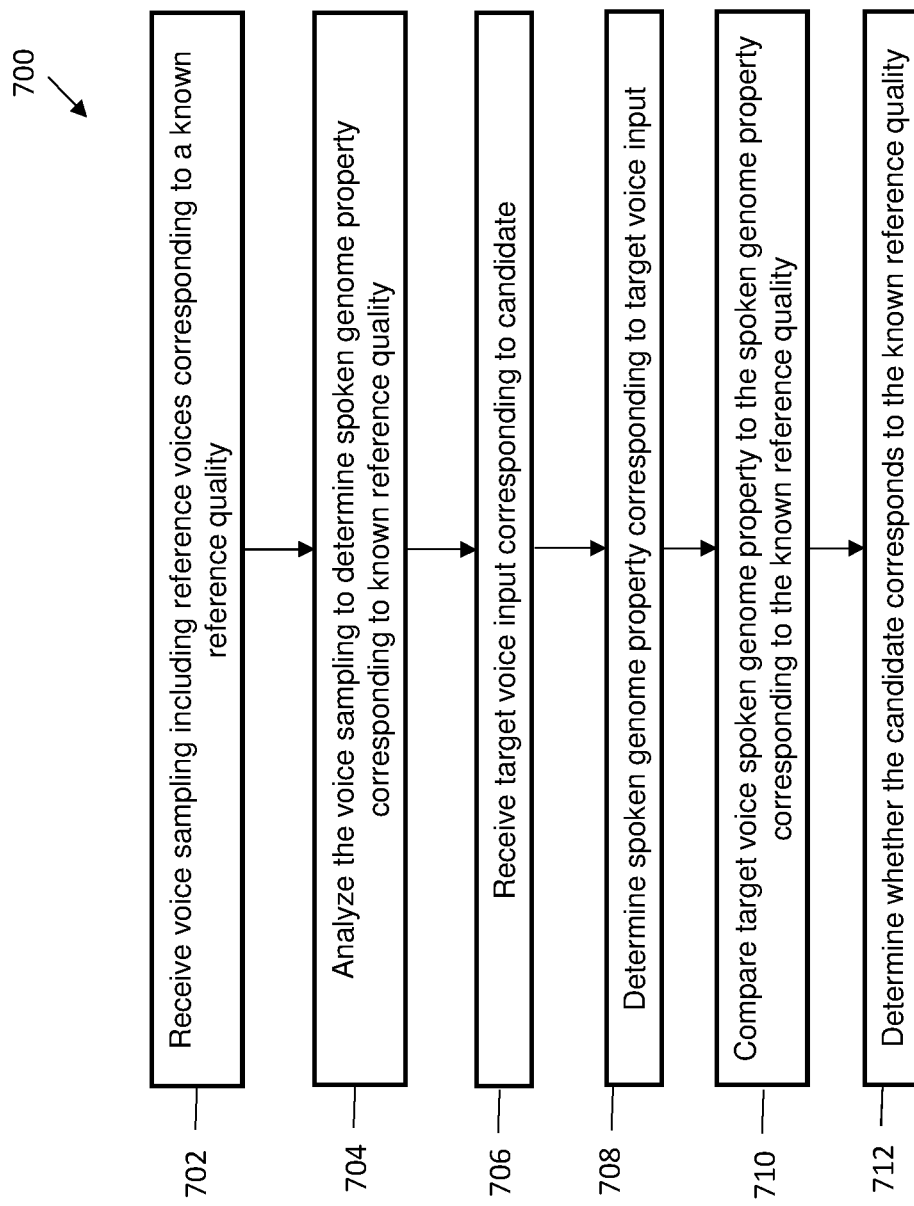
FIG. 9 depicts a flow diagram illustrating a method for characterization and analysis of human voice according to one or more embodiments of the present invention.

FIG. 8 depicts a flow diagram illustrating another method for characterization and analysis of human voice 600 according to one or more embodiments of the present invention. The method 600 includes, as shown at block 602, receiving a first voice sampling including reference voices corresponding to a first known reference quality. The method 600 also includes, as shown at block 604, analyzing the first voice sampling to determine a spoken genome property corresponding the first known reference quality. The method 600 also includes, as shown at block 606, receiving a second voice sampling including reference voices corresponding to a second known reference quality. The method 600 also includes, as shown at block 608, analyzing the second voice sampling to determine spoken genome properties corresponding to the second known reference quality. The method 600 also includes, as shown at block 610, generating a spoken genome database.

FIG. 7 depicts a flow diagram illustrating yet another method for characterization and analysis of human voice 700 according to one or more embodiments of the present invention. The method 700 includes, as shown at block 702, receiving a voice sampling including reference voices corresponding to a known reference quality. The method 700 also includes, as shown at block 704, analyzing the voice sampling to determine spoken genome properties corresponding to known reference qualities. The method 700 also includes, as shown at block 706, receiving a target voice input corresponding to a candidate. The candidate can be, for example, an advertising candidate. The method 700 also includes, as shown at block 708, determining a spoken genome property corresponding to a target voice input. The method 700 also includes, as shown at block 710, comparing a target voice spoken genome property to the spoken genome property corresponding to the known reference quality. The method 700 also includes, as shown at block 712, determining whether the candidate corresponds to the known reference quality.

For example, a couple may be fans of a television show having characteristic clever dialogue that is quickly delivered. The couple could have been searching for similar fast-paced dead-pan delivery programming and could desire to be alerted to shows that have that dynamism and spacing. Embodiments of the invention can identify other shows that the couple is likely to enjoy.

Exemplary embodiments of the invention can aid advertisers in appealing to their target demographic. For instance, a voiceover for an advertisement or the preeminent vocal quality for a television show can be scored for spoken genome categories, such as gender, pitch, cadence, tonality, rhythm, accent, timing, slurring, and elocution. A variety of demographic groups can indicate their preference for various types of content that has been scored. The preferences of such demographic groups can enable an advertiser or producer to select or coach a narrator or actors in the content being presented according to desired attributes.

For example, a 32 year old male, who is single and living in a large city in state X could be searching for a new car and a girlfriend. Embodiments of the invention could determine that males aged 25 to 35 in state X respond to a firm voice from a man that speaks with a steady cadence or to a woman speaking with a faster cadence and that has a relatively low-pitched voice. Embodiments of the invention could also identify that in state Y, the same gender and age group respond most favorably to a woman with a high-pitched voice. Based at least in part on this data, car manufacturers can tailor their ads to meet these needs.

As another example, a couple traveling cross-country by car could be in search of an audiobook that they are likely to enjoy. Embodiments of the present invention can direct the couple to audiobooks they are likely to enjoy. Or, for instance, an internet web-surfer can search the internet repeatedly for interesting content. Embodiments of the invention can aid the web-surfer in locating content she is more likely to find enjoyable.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There can be many variations to this diagram or the steps (or operations) described therein without departing from the spirit of embodiments of the invention. For instance, the steps can be performed in a differing order or steps can be added, deleted or modified. All of these variations are considered a part of the claimed invention.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A processing system for characterization and analysis of human voice comprising:
    a processor in communication with one or more types of memory, the processor configured to:
    receive a first reference voice sampling, wherein the first reference voice sampling comprises a plurality of reference voices corresponding to a first known reference quality;
    analyze the first reference voice sampling to determine a spoken genome property corresponding to the first known reference quality;
    receive a target voice input corresponding to a candidate;
    determine a spoken genome property of the target voice input;
    compare the spoken genome property of the target voice to the spoken genome property corresponding to the first known reference quality;
    determine whether the candidate corresponds to the first known reference quality; and
    output the determination of whether the candidate corresponds to the first known reference quality to a display.

2. The processing system of claim 1, wherein the processor is configured to output the spoken genome property corresponding to the first known reference quality.

3. The processing system of claim 1, wherein the processor is configured to receive a second reference voice sampling.

4. The processing system of claim 3, wherein the second reference voice sampling comprises a plurality of reference voices corresponding to a second known reference quality.

5. The processing system of claim 4, wherein the processor is further configured to analyze the second voice sampling to determine a spoken genome property corresponding to the second known reference quality.

6. The processing system of claim 5, wherein the processor is further configured to generate a spoken genome database.

7. The processing system of claim 6, wherein the spoken genome database comprises a first bin comprising the first known reference quality and the spoken genome property corresponding to the first known reference quality.

8. The processing system of claim 7, wherein the spoken genome database further comprises a second bin comprising the second known reference quality and the spoken genome property corresponding to the second known reference quality.

9. The processing system of claim 1, wherein the spoken genome property is pitch.

10. The processing system of claim 1, wherein the spoken genome property is cadence.

11. The processing system of claim 1, wherein the spoken genome property is tonality.

12. The processing system of claim 1, wherein the spoken genome property is rhythm.

13. The processing system of claim 1, wherein the spoken genome property is timing.

14. The processing system of claim 1, wherein the spoken genome property is elocution.

15. The processing system of claim 1, wherein the spoken genome property is accent.

* * * * *